United States Patent [19]

Weinstein

[11] Patent Number: 5,067,441
[45] Date of Patent: Nov. 26, 1991

[54] ELECTRONIC ASSEMBLY FOR RESTRICTING ANIMALS TO DEFINED AREAS

[75] Inventor: Lee D. Weinstein, Houston, Tex.

[73] Assignee: Torrington Product Ventures, Inc., New Hartford, Conn.

[21] Appl. No.: 625,313

[22] Filed: Dec. 10, 1990

[51] Int. Cl.$^5$ .............................................. A01K 15/02
[52] U.S. Cl. ........................................ 119/29; 340/573
[58] Field of Search ........................... 119/29, 96, 106; 340/573; 455/41, 53

[56] References Cited

U.S. PATENT DOCUMENTS

| 3,753,421 | 8/1973 | Peck | 119/106 |
|---|---|---|---|
| 3,777,712 | 12/1973 | Gardner et al. | 119/29 |
| 3,980,051 | 9/1976 | Fury | 119/29 |
| 4,136,338 | 1/1979 | Antenore | 340/551 |
| 4,335,682 | 6/1982 | Gonda et al. | 119/29 |
| 4,593,273 | 6/1986 | Narcisse | 340/539 |
| 4,675,656 | 6/1987 | Narcisse | 340/539 |
| 4,733,633 | 3/1988 | Yarnall, Sr. et al. | 119/29 |
| 4,745,882 | 5/1988 | Yarnell, Sr. et al. | 119/29 |
| 4,766,847 | 8/1988 | Venczel et al. | 119/29 |
| 4,777,478 | 10/1988 | Hirsch et al. | 340/573 |
| 4,785,291 | 11/1988 | Hawthorne | |
| 4,814,751 | 3/1989 | Hawkins et al. | 340/573 |
| 4,871,997 | 10/1989 | Adriaenssens et al. | 340/539 |
| 4,898,120 | 2/1990 | Brose | 119/29 |
| 4,967,695 | 11/1990 | Giunta | 119/29 |

FOREIGN PATENT DOCUMENTS 2455843 1/1981 France .................. 119/29

OTHER PUBLICATIONS

B1 3,753,421 Peck Reexamination Certificate, 9-25-84.

Primary Examiner—Gene Mancene
Assistant Examiner—R. Thomas Price

[57] ABSTRACT

An animal restraining system includes a radio frequency transmitter adapted to be located adjacent an area in which the animal is to be restrained, a transmitting antenna, and a collar unit worn by the animal. The collar unit has a multiplicity of radio signal receivers each having a highly directional receiving antenna with the receiving antennae of the multiplicity of receivers having their axes of maximum sensitivity oriented in different directions, and an analyzer for determining a composite of the field strengths of the radio signals received by the receiving antennae, and detecting when the composite field strength at the receiving antennae falls below predetermined values. When the detected composite field strength falls below a first predetermined value, a first warning signal is generated to the animal, and a second and different warning signal is generated when the composite field strength falls below a second predetermined value.

27 Claims, 4 Drawing Sheets

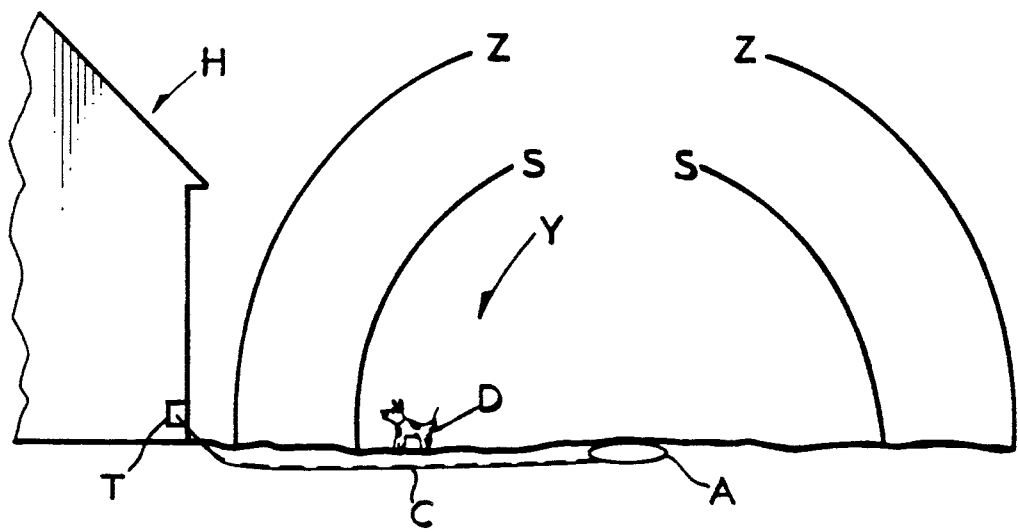
FIG-1
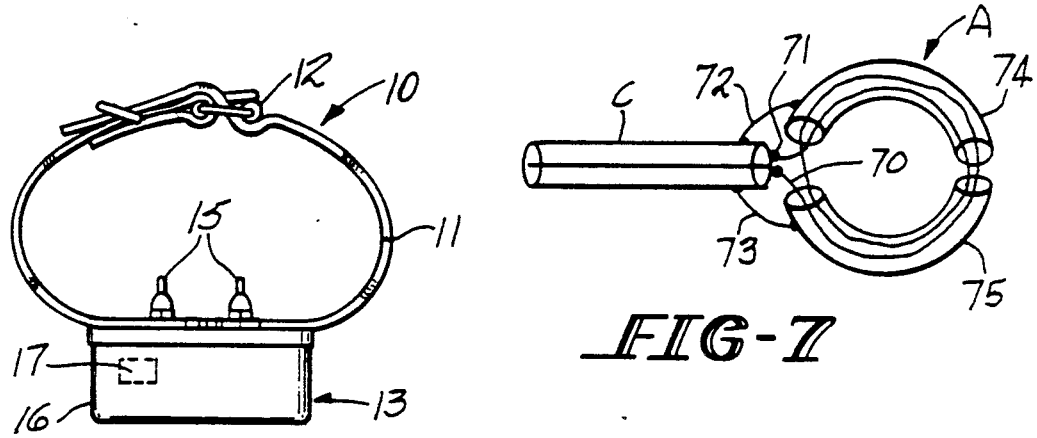
FIG-2
FIG-7
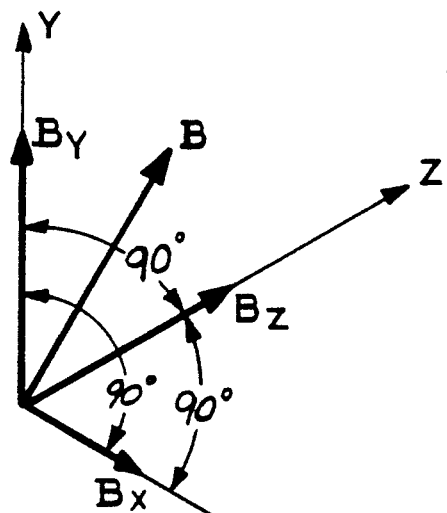
FIG-3

ELECTRONIC ASSEMBLY FOR RESTRICTING ANIMALS TO DEFINED AREAS

BACKGROUND OF THE INVENTION

The present invention relates to animal restraining systems and, more particularly, to such systems which employ radio signals and a collar or the like which is worn by the animal and produces warning signals to prevent the animal from straying from a designated area.

Over the years a number of systems have been developed to provide means for limiting the movement of animals to keep them within an area such as a yard. Peck U.S. Pat. No. 3,753,421 describes a system in which a wire is utilized to define the boundary of the area in which the animal is to be restrained, and a current flows through this wire. The animal to be restrained wears a detector on a collar, and it receives a signal from the wire and will generate a warning shock to the animal if the animal approaches too closely to the boundary wire. This system has enjoyed some success, but has a number of limitations including the requirement for a length of exposed or buried wire carrying current and extending about the perimeter of the area.

Brose U.S. Pat. No. 4,898,120, which is assigned to the same assignee as the present invention, discloses a more sophisticated system in which the parameters of the area in which the animal is to be restrained are determined by evaluating a signal received by a central receiver sent from a transmitter on the animal, and this central unit may then transmit a signal to the device worn by the animal to generate a warning shock, sound or the like. This enables a more sophisticated determination of the area in which the animal is free to roam, and avoids the necessity for exposed wires about the perimeter and the like.

It is an object of the present invention to provide a novel system for retraining an animal to a defined area which employs a relatively simple transmitter, and a unit to be worn by the animal which is reactive to the strength of the signals from the transmitter antenna.

It is also an object to provide such a system in which the receiver unit worn by the animal is operative regardless of the orientation of the animal relative to the transmitter antenna and regardless of the presence of other objects about the animal.

Another object is to provide such a system in which the receiver may be fabricated readily from commercially available commercial components and in a relatively miniaturized form.

Still another object is to provide such a system which is reliable in performance and which is relatively long-lived.

SUMMARY OF THE INVENTION

It has now been found that the foregoing and related objects may be readily attained in an animal restraining system comprising a radio frequency transmitter for generating radio signals which is adapted to be located in or adjacent an area in which the animal is to be restrained. A transmitting antenna is operatively connected to the transmitter for radiating its radio frequency signals, and a unit adapted to be worn by the animal receives the signals.

The collar unit comprises a multiplicity of radio signal receivers each having a receiving antenna, with the axes of maximum sensitivity of the receiving antennae of the multiplicity of receivers being oriented in different directions. There is provided means for deriving a composite field strength based upon the field strengths of the radio signals received by the receiving antennae, and the derived field strength has less directional sensitivity than any of the component antennae. There is also included means for detecting when the derived composite field strength falls below predetermined values. Means in the collar unit is responsive when the composite field strength falls below a predetermined value for generating a warning signal to the animal.

Desirably, there are three receivers in the unit each employing a highly directional equally sensitive antenna, and the composite field strength is the vector sum of the detected field strength of the signals received by the antennae, which is derived from the square root of the sum of the squares of the field strengths of the signals received by the three antennae, which are oriented with mutually perpendicular (i.e., orthogonal) axes of maximum sensitivity.

Preferably, field strength signals from the receivers are time division multiplexed and converted to a DC voltage, desirably by an RMS to DC converter. The transmitting antenna is desirably of the magnetic loop type with a minimum electric dipole response, and the receiving antennae are of magnetic loop type with a ferrite core.

In the preferred assembly, the unit has means for detecting when the composite field strength falls below either of two predetermined values, and two signal generating means cooperating therewith.

The unit may include means for activating the second warning signal means if the animal remains in an area within the range bracketed by the first and second predetermined values for a period in excess of a predetermined time. It may also include means for disabling the second warning signal means if the animal does not leave the area bracketed by this range and return to an area with a field strength greater than the first predetermined value.

Desirably, there is included means for disabling both warning signal means if the animal remains in an area where the field strength is below the first predetermined value for a period in excess of a predetermined time, and the disabling means for the warning signal means is reset, and the system is reactivated upon return of the animal to an area wherein the signal field strength is above the first predetermined value.

Preferably, the unit includes means for analyzing the composite field strength for a period of time before the warning signal generating means are activated, and it is also preferred that the transmitter frequency is within the range of 80 KHz to 15 MHz. To perform the several evaluations, the unit employs a microprocessor.

BRIEF DESCRIPTION OF THE DRAWINGS

FIG. 1 is a schematic illustration of an environment utilizing the animal restraining system of the present invention;

FIG. 2 is a side elevational view of a dog collar unit embodying the receiver assembly of the present invention;

FIG. 3 is a vector diagram depicting the field strength of signals received at several antennae and the derived composite field strength thereof;

FIG. 7 is a partially diagrammatic illustration of the transmitting antenna of FIG. 1.

DETAILED DESCRIPTION OF PREFERRED EMBODIMENT OF THE INVENTION

Figure 5A:
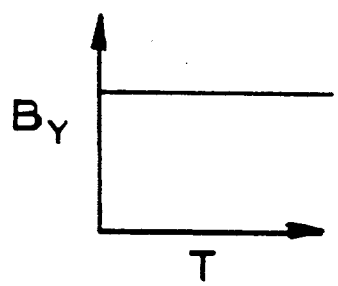
FIG. 5a–5e are diagrams in graphic form of received signals plotted with respect to time.

Referring now to the drawings, FIG. 1 is exemplary of an environment in which the animal restraining system of the present invention may be used. A house designated H has a yard Y in which a dog D is permitted to roam. The system includes a transmitter T on or within house H having a coaxial cable C leading to an outdoor remote antenna A. The cable C is predominantly or completely underground as may be antenna A. The boundary lines S and Z separate three zones of radiation from antenna A based on radial distance from the antenna.

The system of the present invention comprises the fixed position transmitter T which continuously transmits a radio frequency (RF) signal and a mobile receiver assembly mounted in the collar unit 10 on the dog D. The receiver assembly receives the RF signal and measures the intensity or field strength of the received signal. Since the field strength of the transmitted signal falls off as the distance of the receiver assembly from the transmitter antenna A increases, it is possible to measure the distance from the antenna A to the receiver assembly and dog by measuring the field strength of the transmitted signal at the receiver assembly.

The dog D in FIG. 1 wears a collar unit generally designated by the numeral 10 seen in FIG. 2 which includes a strap 11 having a buckle 12 adapted to be secured about the dog's neck. The collar unit 10 has a receiver assembly generally designated by the numeral 13 disposed within the housing 16, and it has two electrodes 15 thereon which may be utilized for shocking or "zapping" the dog. The housing 16 will generally be suspended at the lower portion of the collar unit 10, i.e., below the dog's neck, and the housing 16 has an opening (or portion transparent to sound) 17 which permits the emission of an audible sound which the dog may hear. Also included within the housing 16 is a receiving system including a plurality of receivers each with an antenna oriented with its axis of maximum sensitivity at a predetermined angle as will hereinafter be described.

In the present invention, the receiver assembly 13 mounted on the dog collar 10 may determine the distance from the antenna A by measuring the received signal strengths at each of its receivers. However, if the orientation of the dog with respect to the transmitting antenna A were allowed to affect the measurement, the dog would not be able to learn what areas of the yard Y are permissible for its movement and what are not, since the signal strength would depend in large measure upon the direction in which the dog was facing, and also upon whether the receiver was on the side, top or bottom of the dog's neck and upon the dog's height.

Moreover, it is additionally desirable that the field pattern projected by the transmitter be uniform in all directions in order that a reasonably predictable circular containment area may be established and that the field pattern provide maximum radial differentiation in order that the radial distance from the transmitting antenna A be accurately and repeatably measurable. "Maximum radial differentiation" means that the field strength should have the largest percentage variation per unit distance from the transmitter. A given level of noise in the system will result in a smaller spatial measurement uncertainty in a system where the field strength changes more rapidly with distance from the transmitter.

Lastly, it is desirable that the transmitter and particularly the receiver should consume minimum power. The receiver assembly 13 mounted on the collar unit 10 of the dog as hereinafter described includes three separate receivers. With this arrangement, the length or strength of a received signal vector B in space with respect to different axes may be measured.

FIG. 3 is a vector diagram made up of substantially mutually perpendicular component vectors $B_x$, $B_y$, $B_z$ respectively indicating received field strengths extending along the substantially perpendicular X, Y, and Z axes. The length of the resultant vector B is the square root of $[(B_x)^2+(B_y)^2+(B_z)^2]$. Thus, by measuring the magnetic (electric) field components along each of the axes X, Y and Z of the receivers, information necessary to calculate a total field vector may be derived.

Figure 4:
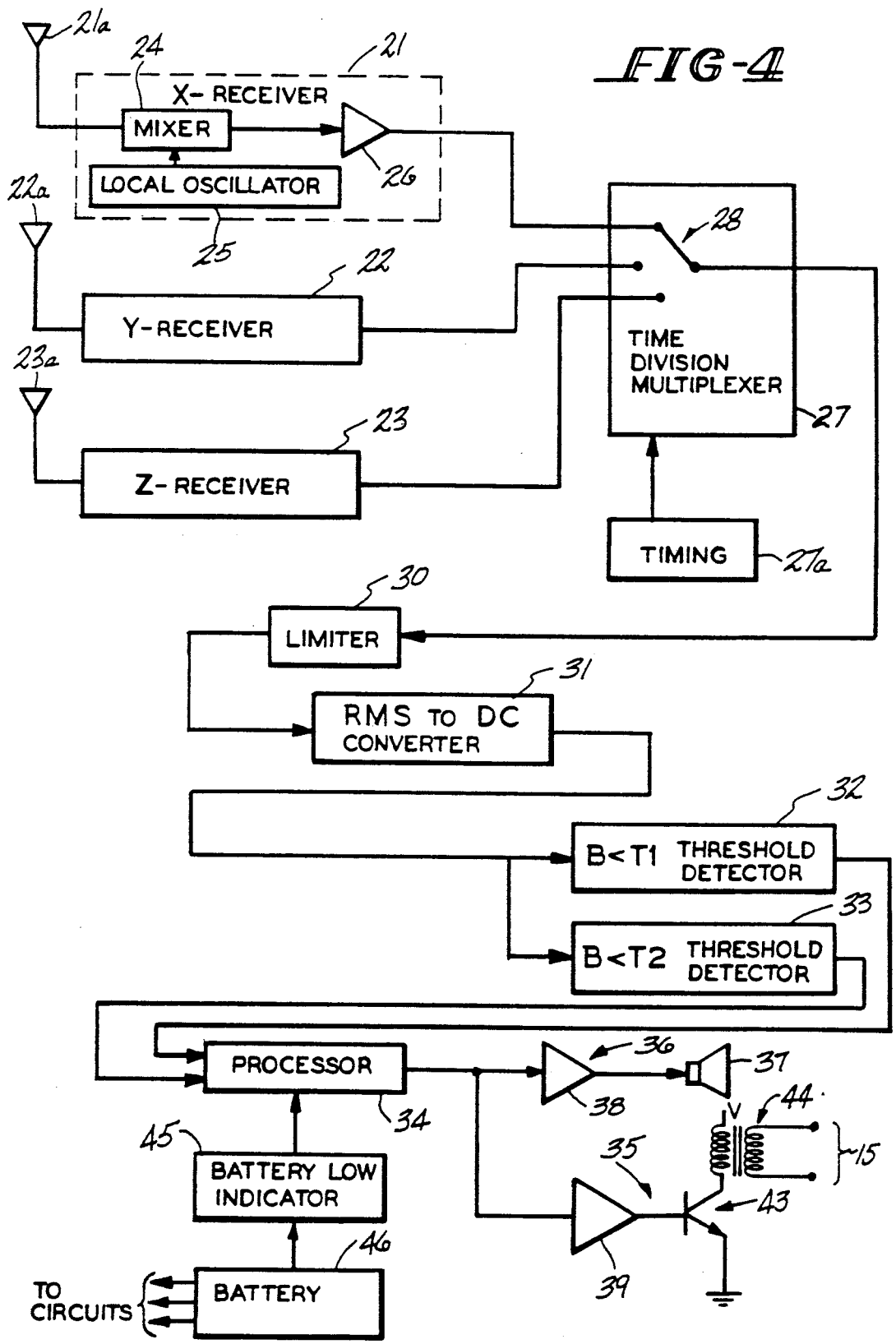
FIG. 4 is a diagram in block and partially schematic form of a receiver assembly embodying the present invention.

FIG. 4 is a block diagram of the receiver assembly 13 as contained within the housing 16 of the collar unit 10 as exemplified in FIG. 2.

As will hereinafter be more fully described, the receiver assembly 13 includes three antennae 21a, 22a and 23a, each of which is highly directional and whose axes of maximum sensitivity are substantially mutually perpendicular (i.e., orthogonal), the antennae are adapted to receive a radio frequency signal from antenna A transmitted from transmitter T at a central point as seen in FIG. 1.

The receiver assembly 13 also includes three receivers 21, 22 and 23 connected to receive the output of antennae 21a, 22a and 23a, respectively. The signals received at the receiving antennae 21 are all from the antenna A.

Each of the antennae 21a, 22a and 23a is preferably of a magnetic loop type wound on a ferrite core. Loop type antennae are preferred because the effective length of the magnetic loop type antenna may be enhanced by winding more turns of the antennae wire on the ferrite core without substantially increasing the physical size of the antenna and because the presence of a conducting object such as an animal does not substantially effect the magnetic field. Each of the antennae 21a, 22a and 23a are highly directional; the X antenna is aligned for maximum sensitivity along the X axis and near zero sensitivity along the Y and Z axes; the Y antenna is aligned for maximum sensitivity along the Y axis and near zero sensitivity along the X and Z axes; and the Z antenna is aligned for maximum sensitivity along the Z axis and near zero sensitivity along the X and Y axes. However, it will be understood that, dependent upon the orientation of the dog, each antenna may pick up transmitted signals of different field intensities. The X, Y, and Z axes are arbitrarily defined but must be mutually perpendicular for the preferred method of composite field strength determination.

As illustrated only with respect to the receiver 21, each of the receivers 21, 22 and 23 apply the received RF signals to the primary inputs of mixers 24 which also receive secondary inputs from the local oscillator 25. The mixers 24 of the several receivers 21, 22, 23 output to an amplifier/filters 26. If so desired, the local oscillator 25 may be common to all receiver mixers 24. Each of the receivers 21, 22, 23 outputs to a time division multiplexer 27 which is shown in simplified form as a three-way switch 28; however, the time division multiplexer 27 operates under the control of a clock 27a as will hereinafter be described. The output of the time division multiplexer 27 is applied to the limiter 30.

As will hereinafter be shown, if the axes of maximum sensitivity of antennae 21a, 22a, 23a are not orthogonal, a set of perfectly orthogonal signals could be derived from a mathematical manipulation of the signals of the non-orthogonal antennae for small perturbations from perfect orthogonality. This mathematical manipulation can be approximated by a linear sum which is easily implemented in analog circuitry as adders and subtractors with different gains. However, in order to reduce circuit complexity, cost, power consumption, and space it is desirable to position the antennae 21a, 22a, and 23a such that their axes of maximum sensitivity (or corresponding planes of minimum sensitivity) are mutually perpendicular, (i.e., a cube corner) so that their output signals in the respective receivers represent an orthogonal vector set.

Each of the receivers 21, 22, and 23 includes a conventional antenna resonance circuit (not shown) followed by the mixer 24, followed by an amplifier-filter 26. The antenna resonance circuitry makes the magnetic loop antenna part of an L-C resonant circuit, tuned to resonate at the chosen operating frequency of the transmitter. This resonator acts as a signal frequency transformer which boosts signal voltage within a narrow band of interest, while also boosting the apparent impedance of the antenna. Thus, the radiation resistance of the antennae appears larger to the mixer's primary input than it would without resonance. This may be viewed as boosting the input signal or increasing the signal to noise ratio for better performance of the system.

The amplifier filter 26 of each receiver provides enough gain of the signal from the mixer 24 so that it may be conveniently acted upon by available lower threshold detecting circuitry as hereinafter discussed. In addition to providing gain, the amplifier-filters 26 act to limit the frequency band width of the system, thereby maximizing the signal to noise ratio. Preferably, the output bandwidth is 200 Hertz or less. Because of the narrow band width and the high signal to noise ratio, the system is highly sensitive and can be made to detect very weak signals.

The output of each of the receivers 21, 22 and 23 is a low frequency sine wave whose amplitude is proportional to the field strength sensed by the particular receiver. These outputs are applied to the time division multiplexer 27 which samples at a rate which is fast compared to both the period of the low frequency sinusoidal receiver output signals and the averaging time constant of the RMS to DC converter 31. The multiplexer 27 may be a conventional 4066 analog multiplexer which is driven by a counter sequencer of a local clock signal, all generally shown by timing block 27a.

Since the sampling time at the time division multiplexer 27, (which may also be referred to as a chopping period) is short compared to the averaging time constant of the converter 31, it is preferable to make the chopping period short compared to the period of the sinusoidal receiver output signals.

The function of converter 31 is to produce a voltage which is proportional to the square root of the sum of the squares of the amplitudes of the sinusoidal outputs of the three receivers 21, 22, 23, which are proportional to the field strengths received at antennae 21a, 22a, and 23a. Such RMS to DC converter chips are commercially available for voltage measuring instrumentation, and a typical chip is that designated AD-537 and made by Analog Devices of Wilmington, Mass.

A limiter 30 is optional and is positioned between the output of the time division multiplexer 27 and the converter 31 to limit any pulse stretching effect of the averaging circuit in converter 31.

The output of the RMS to DC converter 31 is applied to threshold detectors 32 and 33; the threshold detector 32 detects when the vector field strength B (FIG. 3) of the received signal(s) is less than a first threshold $T_1$, while threshold detector 33 detects when the field strength B is less than a second threshold value $T_2$.

If the measured field strength as determined by converter 31 is above both thresholds, the dog is determined to be in what may be referred to as the safe zone (within the boundary S of FIG. 1). If the field strength B falls below the upper threshold $T_1$ but is still above the lower threshold $T_2$, the dog is said to be in a warning zone (the zone between S and Z of FIG. 1). If the field strength signal B falls below both the $T_1$ and $T_2$ thresholds, the dog is said to be in the zap or shock zone (outside boundary Z of FIG. 1).

The outputs of the threshold detectors 32, 33 are applied to a processor 34 as hereinafter described, and it may generate a signal to a shock or zap circuit 35 having the collar electrodes 15 therein or to an audio beep circuit 36 having an output connected to an audio device such as an electroacoustic transducer 37. Depending upon the detected threshold, the processor 34 will apply signals to audio circuit 36 or shocking circuit 35.

The audio circuit 36 comprises an amplifier 38 which outputs to an audio device 37 such as a piezoelectric beeper. The shocking circuit 35 comprises an amplifier 39, which outputs to a transistor 43 having a flyback transformer 44 in its collector circuit which applies a high shocking voltage to the collar electrodes 15.

The processor 34 also receives an input from a low battery detector 45, which monitors the battery 46 supplying electrical potential to the various circuits of FIG. 4.

Figure 5B:
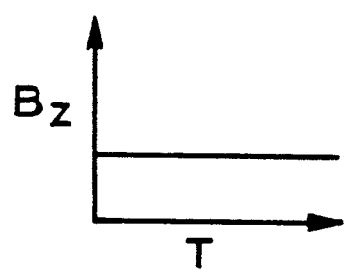
Figure 5C:
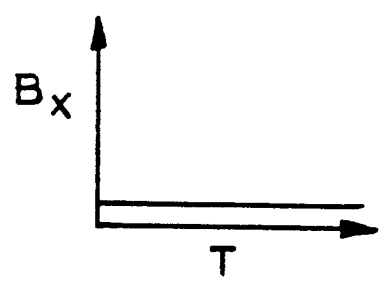
Figure 5D:
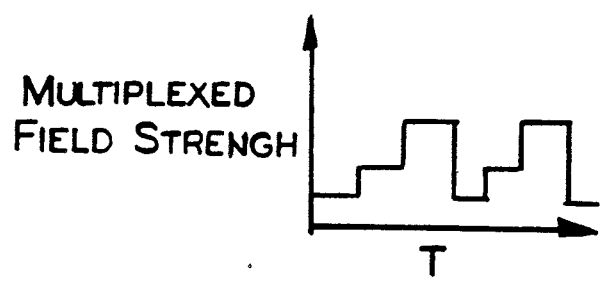
Figure 5E:
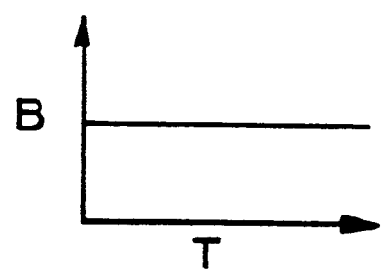

Turing now to FIGS. 5a–5e, these show various example wave forms which might occur in the receiving system of FIG. 4, and they should also be considered in conjunction with the vector diagram of FIG. 3. FIG. 5a represents the field strength $B_y$ of the RMS signal received at antenna 22a of the receiver 22; FIG. 5b represents the field strength of the signal received at antenna 23a of the receiver 23; and FIG. 5c represents the field strength of the signal received at antenna 21a of receiver 21. FIG. 5d depicts the output of multiplexer 27 as it sequentially samples the outputs of the receivers in the order of X, Z, and Y. FIG. 5e depicts the signal B from converter 31 which is indicative the square root of $$[(B_x)^2+(B_y)^2+(B_z)^2]$$

and gives a measure of the distance of the receiver assembly 13 of FIG. 4 from the transmitting antenna A of FIG. 1.

Although it is preferable that the three antennae 21a, 22a and 23a have orthogonal sensitivities, (i.e., mutually perpendicular), this is not absolutely necessary. As previously pointed out, the resultant vector B may be derived as the square root of the sum of the squares of the orthogonal component field strengths. Assuming that the received field strengths at the receiving antennae are not each proportional to only one of the component vectors $B_x$, $B_y$ and $B_z$, but have some sensitivity to the other components of the field, then three equations in three unknowns can be expressed in three equations:

$$A_x = C_{xx}B_x + C_{xy}B_y + C_{xz}B_z$$

$$A_y = C_{yx}B_x + C_{yy}B_y + C_{yz}B_z$$

$$A_z = C_{zx}B_x + C_{zy}B_y + C_{zz}B_z$$

wherein the C's are constants, A is the signal from the antenna (non-orthogonal) and B is the derived (orthogonal) component vector. These equations can be solved for the vectors $B_x$, $B_y$ and $B_z$ (FIG. 3), and the resultant field vector B can then be derived as the square root of the sum of the squares of the derived component vectors $B_x$, $B_y$ and $B_z$.

The processor 34 contains various timing circuits for determining elapsed time with regard to the location of the animal with respect to the antenna A.

Figure 6:
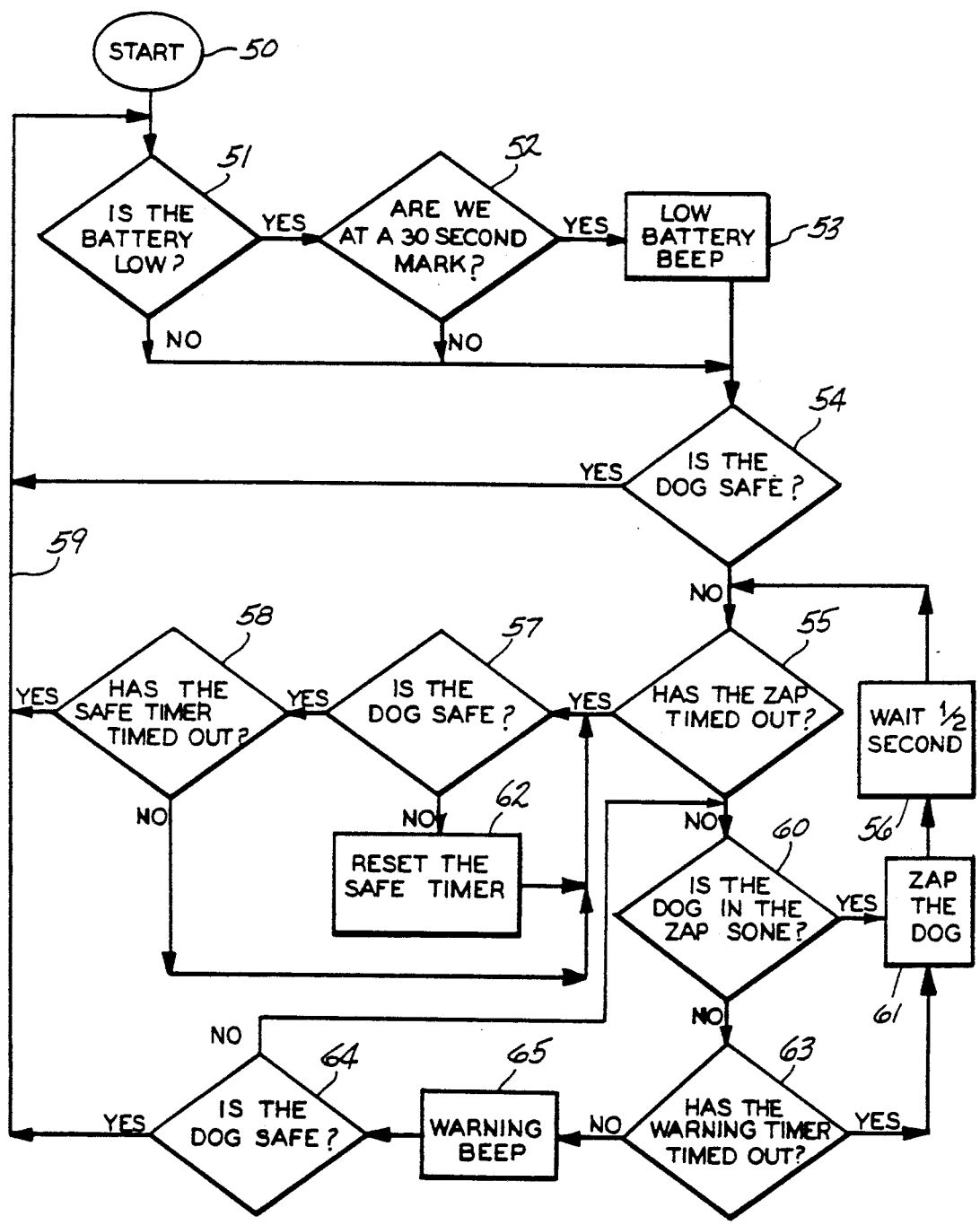
FIG. 6 is a flow chart of the logic for operation of the processor of FIG. 4.

FIG. 6 exemplifies a flow chart of the logic of the processor 34. The start of the program is indicated at 50 when the dog is permitted to be outside and the transmitter T is turned on. If the dog is in the safe zone bounded by S in FIG. 1, no action takes place unless the low battery detector 45 determines the battery voltage to be low, as indicated by block 51. In this instance, the processor 34 activates the beeper 36 and amplifier circuit 38 for a brief interval (for example, one quarter of a second every thirty seconds as indicated by block 52). The low battery beep tone may be of a significantly different frequency than the warning tone so that the dog will be less likely to fear that he is about to be shocked. The low battery beep is indicated by the block 53.

If the dog wanders into the warning zone, i.e., between lines S and Z in FIG. 1, the processor 34 through amplifier 38 and audio device 37 will begin to generate warning signals. If the dog returns to the safe zone, the beeping stops and everything returns to the initial state as exemplified by block 54. If the dog stays in the warning zone too long (between lines S and Z of FIG. 1), the processor 34 will treat the dog as though it had wandered into the shock or zap zone as indicated by block 63. If the dog ignores the warning beeps and crosses boundary Z into the zap zone as indicated by block 60, the dog will immediately be zapped.

The warning beeping continues when the dog is zapped. Also at this time, a timer as exemplified by block 56, gives an opportunity for the dog to return to the safe zone before a second zap signal is generated. If the dog does not return, it is again zapped and given another moment to return to the safe zone. This process will repeat until the dog returns to the safe zone as indicated by block 57 or until the zap timer 55 times out. In the event of such return, it will be determined whether the safe timer has timed out, as indicated by the block 58. If the same timer has timed out, the system resets as indicated by a signal over line 59 to the start 50.

The threshold detector 33 will determine whether the dog is in the zap zone as indicated by block 60 and, if so, a signal will be given to zap the dog as indicated by block 61. If, at the time indicated by block 57, the dog is not in the safe zone, the safe timer indicated by the block 62 will be reset. This process will repeat until the dog either returns to the safe zone or the zap timer times out.

If the dog returns to the safe zone for the amount of time specified by the safe timer, the system resets to its initial condition. If the dog endures the zaps for the full count (until the zap timer times out) and runs away, the system will go into a dormant state (loop of 62 and 57) until the dog returns to the safe zone. While the system is in the dormant state, the receiver assembly 13 is not able to beep or zap the dog.

If the dog has left the zap zone and the warning timer has not timed out as determined by block 63, and the dog is not in the safe zone as determined by block 54, the system will stop zapping the dog.

Additionally, after the warning timer 63 has not timed out, a warning beep may be given through the amplifier 38 and the beeper or audio device 37 as indicated by the block 65. At this time, if the dog is in the safe zone as determined by block 64, the system will be re-started on the premise that the dog has returned to the safe zone.

The foregoing explanation of the processor 34 is based upon an exemplary program which may be utilized to control the movements of the dog in connection with the restraining assembly of the present invention. Other programs may be utilized with other dependencies on the dog's presence in the safe, warning and zapping or shocking zones and the timing or speed of the dog's movement between these zones.

Although a general overall program has been shown for processor 34, including timing circuits to terminate the shocking action if the dog leaves and remains outside the area in which it is to be confined, it is to be understood that the primary purpose of the invention is to restrain the dog in the safe zone, and other programs may be implemented.

The system of the present invention is designed to provide a uniform circular field pattern with respect to the transmitting antennae A, good radial accuracy, and minimum interference from objects in close proximity to the receivers. This is achieved by selection of the wave length and therefor the frequency of the transmitter operating frequency. If a short wave length (e.g., 49 MHz which has a wavelength of about 6.1 meters) is utilized, then common objects may act as resonators and distort the field strength pattern. Any conducting object with any dimension on the order of a quarter of a wave length or more may act as some form of significant RF resonator or reflector to the transmitted wave. For example, at a transmitting frequency of approximately thirty Megahertz or more, a person or a dog may act as a significant resonator and significantly distort the field. Thus, the dog's orientation significantly affects the field strength at the dog's collar. The presence of conducting objects including people near the dog significantly affects the field strength of the signal at the dog's collar. Thus, at a selected relatively high frequency and even if there is a perfect field strength measuring receiver, it is not always possible to tell unambiguously how far the dog is from the antenna without knowing which way the dog is pointing, and who and what happens to be near the dog.

This problem may be obviated by operating the system at a much lower frequency (longer wavelength). For example, if a frequency of approximately one Megahertz is used, the wave length is on the order of approximately one thousand feet so that even objects like a house do not drastically distort the field, and common movable objects have virtually no effect on the field. Even more importantly, the orientation of the dog has no significant effect on the field.

In order to be able to sharply differentiate one distance (from the transmitter) from another, it is desirable to have the field strength fall off sharply in the region where one wishes to make a distinction (for instance, between "dog is safe", and "dog is out of bounds"). In the far field of any radio frequency transmitter, both the electrical and magnetic field strengths fall off at the rate of $1/r$, where r is the radial distance from the transmitter. In the near field, however, the magnetic and electric fields fall off more sharply. If the source of the field (i.e., the transmitter antenna) is a magnetic dipole, (i.e., loop-type antenna) then the magnetic field falls off as $1/r^3$ in the near field, and the electric field falls off as $1/r^2$. If the source of the field (i.e., the antenna) is an electric dipole, then the magnetic field falls off as $1/r^2$ in the near field, and the electric field falls off as $1/r^3$. In either case, these values fall off until they become coincident with the $1/r$ strengths of the far field at the near-to-far-field transition radius, which occurs at a radius of $$\frac{1}{2\pi}$$

wavelengths from transmit antenna.

Since the $1/r^2$ field and $1/r^3$ field both are much more sharply differentiated in space than a $1/r$ field, they will give the system better accuracy in the presence of noise. Therefore, it is preferable that the wavelength used be not only long enough that objects such as people and dogs do not perturb the field, but also long enough that the proposed boundary be within the near field, making the boundary more accurately defined and repeatable. Once again, an exemplary frequency of 1 MHz is well suited, since the near-to-far-field transition radius is about 157 feet, and the preferred system is designed to work at a distance of up to about 100 feet.

The desirable operating frequency is chosen as a function of the desired control radius, and is normally in the range of 80 KHz to 20 MHz. The boundary becomes between 2 and 3 times less accurate when the wavelength is less than 2 times the control radius. Thus, for a system designed for a control radius of 20 to 200 feet, the optimon operating frequency would range between 800 KHz and 8 MHz. If the operating frequency goes above 10 MHz, the performance of ferrite core loop antennas begins to degrade. If the operating frequency falls below about 70 kHz, it becomes difficult to receive the signal at 100 feet without transmitting at more power than the FCC will allow without a license. The overall desired operating frequency is thus between 70 kHz and 20 MHz.

Ideally, the collar unit would contain an antenna which was equally sensitive to all orientations of the field. Unfortunately, such a totally omni-directional antenna is not feasible, and real life antennas are often quite directional. Through the use of multiple highly directional antennae, the present invention implements a true omni-directional field strength measuring device.

One may visualize the electric and magnetic field lines of radio waves as field lines moving perpendicularly to their axes through space. An electric dipole antenna may be used to sense the electric field lines, or a magnetic dipole (loop) antenna may be used to sense the magnetic field lines. In the case of the electric dipole antenna, it is most sensitive when perfectly aligned with the electric field lines, and has no response if aligned perpendicular to the electric field lines. In the case of the magnetic dipole (loop) antenna, it has maximum sensitivity when aligned so the magnetic field lines are aligned with the axis of the loop, and it has no response to magnetic field lines aligned perpendicularly to the axis of the loop.

Simply linearly combining the outputs of multiple antennae does not solve the directionality problem, because there will always be some combination of field strengths in different directions at different phases that will cause a zero output from the combined antenna, although the total field strength is far from zero.

If it is desired to measure the strength of a field line in space although its orientation is unknown, the strength of the field line may be considered as the length of a vector pointed along the field line. Any vector may be considered in Cartesian coordinates as the sum of three mutually perpendicular component vectors, referred to as the x vector (of length $B_x$), the y vector (of length $B_y$), and the z vector (of length $B_z$), as illustrated in FIG. 3. The length of the total vector is the square root of $[(B_x)^2+(B_y)^2+(B_z)^2]$. This is a geometric concept which is independent of the orientation in space which is chosen to set up the coordinate system so long as our chosen x, y and z axes are mutually perpendicular, i.e., orthogonal. Thus, one may choose any mutually perpendicular x, y and z axes and, if the magnetic (or electric) field component is measured along each of these axes, the information is provided to calculate the total field.

Thus, the receiver assembly of the present invention desirably uses three highly directional receivers (one sensitive only to the X-oriented field, one sensitive only to the y-oriented field, and one sensitive only to the z-oriented field). A signal proportional to the square root of the sum of the squares of their respective received signal strengths is derived. By using three highly directional receivers, with their outputs nonlinearly combined it appears as though a totally omni-directional antenna were being employed.

As will be appreciated, the electric field is more sharply differentiated in the near field of an electric dipole transmit antenna and the magnetic field is more sharply differentiated in the near field of a magnetic dipole transmit antenna. In order to obtain maximum radial differentiation and accordingly maximum accuracy and repeatability, it is desirable to use an electric dipole receive antenna if an electric dipole transmit antenna is used, and a magnetic loop receiving antenna as previously described if a magnetic loop transmit antenna is used. Although unlike antennae may be used in the transmitter and receiver, the accuracy and repeatability will be slightly degraded.

Loop-type antenae are used because the effective length of a magnetic-loop type antenna may be increased by winding more turns on the antenna coil, without substantially increasing the physical size of the antenna, and because the transmitted magnetic field is not disturbed by objects such as animals or people, whereas the electric field is. Each of these antennae is highly directional. The x antenna is aligned for maximum sensitivity along the X axis (and near zero sensitivity along the Y and Z axes). The Y antenna is aligned for maximum sensitivity along the Y axis (and near zero sensitivity along the X and Z axes). The Z antenna is aligned for maximum sensitivity along the Z axis (and near zero sensitivity along the X and Y axes). The x, Y and Z axes are all mutually perpendicular.

If the sensitivity of the antennae were not perfectly orthogonal, a set of perfectly orthogonal signals could be derived from a mathematical manipulation of the signals from the not-perfectly-orthogonal antennae. For small pertubations from perfect orthogonality, this mathematical manipulation can be well approximated by a linear sum, which is easily implemented in analog circuitry as adders and subtracters with different gains. However, in order to reduce circuit complexity, cost, power consumption and space, it is desirable to position the antennae so that their output signals already represent an orthogonal vector set. For any application which would require a higher degree of accuracy in the alignment of the antennae, summing circuitry with potentiometrically variable coefficients may be used to give final precise tweaks to derive more perfectly orthogonal components. This is not deemed necessary for the present application.

To minimize or avoid the potential for the radiated RF signal to follow the cable C to the house and thence through the power lines, a magnetic loop type transmit antenna is preferred because it has an electric dipole field at the antenna which is much smaller, and the electric field guided back to the house is also smaller. With such a system, it is possible to have a safe zone which extends only a few feet under or over the power lines.

However, a magnetic loop antenna still has an electric dipole moment since it may be pictured as an inductor with a radio frequency AC voltage on it. Since the antenna acts as an inductor, there is a continuously distributed voltage drop across the coil. If the antenna were only one turn, the voltage at a point half way about the circumference would vary at half the amplitude of the voltage being applied to the one turn of wire. Since the coil has a diameter, this point with the varying voltage is at a distance A, from the ground shield of the cable, so the antenna may be regarded not only as a magnetic loop antenna, but also as a (simultaneous) electric dipole antenna of a length A. As in the case of the single-ended electric dipole antenna, significant energy is guided back to the house by the cable, and undesirable coupling to the utility lines can occur.

The loop antenna cannot simply be encased in a shield because it would source no magnetic field, and it would not transmit. A split shield allows the antenna to source magnetic field, but also significantly reduces electric field.

To provide a well defined area, it is preferable that the transmitter antennae transmit a uniform circular field pattern suitable for maintaining the dog within a given radial distance of the antenna. The split shield magnetic loop antenna as shown in FIG. 7 is designed to provide minimum coupling to utility lines and a uniform circular field pattern with respect to the transmitting antennae A, good radial accuracy, and minimum interference from objects in close proximity to the receivers. This also requires selection of a desirable wave length or frequency of the signal generated by the transmitting antennae A.

The transmitter antenna A is connected to coaxial cable C from (FIG. 1) the transmitter T. The conductor 70 of the loop antenna A is connected to the shield of cable C at point 71. The loop 70 of the antenna A has two spaced substantially semi-circular shields 74 and 75 which are connected to the shield of cable C as exemplified by lines 72 and 73.

As seen, the two shields 74 and 75 each run almost half way around the loop coil (to the side opposite from where the cable C connects), but they do not meet on the other side and a gap is left intentionally. Were the gap not there, the split shields would form a shorted loop, and this would cancel out the magnetic field the antenna is trying to source. Since the shields do not meet, no loop current flows in them, so they have minimal interaction with the magnetic field intended to be sourced. However, they are electrically connected to ground. Since no significant currents flow in the shields, they do not have much inductance voltage drop, and they remain close to ground potential. This nearly cancels the electric dipole moment of the loop antenna, and the minute electric dipole moment that comes from the gap in the shield is insignificant and can be ignored. The split-shield loop antenna has been tested and no safe zone was found near power lines, provided good isolation techniques were used to keep the transmitter circuit from coupling directly to the utility through its power cord.

This configuration provides an antenna which is of the magnetic loop type but substantially cancels any electric dipole effect and coupling of the loop to the utility power lines. This antenna provides a uniform transmitted field pattern which defines the area of restraint of the animal. The conductor of antenna A is insulated in a suitable jacket for underground installation.

Each receiver consists of antenna resonance circuitry, followed by a mixer, followed by an amplifier-filter. The antenna resonance circuitry makes the magnetic loop antenna part of an L-C resonant circuit, tuned to resonate at the chosen operating frequency of the system. This resonator acts as a single-frequency "transformer" which boosts signal voltage within the narrow band of interest, while also boosting the apparent impedance of the antenna. The radiation resistance of the antenna appears much larger to the input electronics than it would without the resonance. This may be viewed as boosting the input signal or increasing the signal-to-noise performance of the system. Since the receiver circuitry should consume very little power, and since incremental input impedance of bipolar transistor circuitry generally increases as operating currents decrease, the input impedance of the first stage of the electronics (in this case, the mixer) of a very low-power system is generally very high.

If the input resistance of the input stage is larger than the output resistance of the antenna, the noise of the system will be dominated by the input electronics, which is a waste. In order to derive the best signal-to-noise performance, it is desirable to transform the antenna impedance until it is on the order of the input impedance of the electronics. The lower the power of the circuitry, the more the antenna impedance should be boosted by the input resonator.

Following each input resonator is a fully balanced mixer, with an integral RF gain of 40. The mixer is implemented as a Gilbert Cell, which multiplies the (RF) input from the antenna resonator by a periodic waveform generated by the local oscillator. This multiplication process translates the band of the input frequency information which is around the frequency of the local oscillator down to baseband. Thus, if the difference between the local oscillator frequency and the transmitter frequency were 10 Hz, the output of the mixer would include a 10 Hz sine wave. The output of the mixer is very broad band, and it contains many frequencies not of interest. The closer the frequency of the local oscillator can be held to the transmitter frequency, the more the unneeded bandwidth can be rejected. Narrowing the bandwidth of the receiver is desirable because the background noise in a narrow region of the AM broadcast band (which is the frequency range in which the unit desirably operates) can be considered to be constant, and thus the signal-to-noise ratio increases as the bandwidth decreases.

If position determination is required within a tenth of a second, the measurement bandwidth must be on the order of 3 Hz. If the dog is moving around, the received signal is changing in amplitude: this is inherently an amplitude modulation, and it will have the frequency spectrum of an amplitude modulation.

The minimum acceptable bandwidth for the receiver is on the order of 6 Hz, but implementation dependent factors may require the bandwidth to be even wider. First, the temperature of the receiver may vary over quite a wide range, depending on the environment of the dog (snow, sun, etc.). The design temperature range for the system under consideration is 0° F. to 120° F. Standard AT cut quartz crystals drift about 50 parts per million over this temperature range, so that even if the local oscillator is a good quartz oscillator, it will require an additional 50 Hz bandwidth for the receiver. Producing an economical low power oscillator will result in even more drift, resulting in a bandwidth on the order of twice as wide. A low-cost unit employing a low-power crystal oscillator will require about 100 Hz bandwidth at the receiver. Using phase locked loop to track transmitted carrier frequency would allow a narrower receive bandwidth than a non-tracking oscillator. Such performance was not deemed necessary for the system under consideration, but should be considered within the scope of the invention. Temperature compensation of the oscillator for improved performance is also to be considered within the scope of the present invention.

The amplifier filter circuit should provide enough gain to the signal so that it may be conveniently acted upon by commonly available low-power threshold detecting circuitry (for example, low power comparators of Schmitt Trigger circuits). In addition to providing gain, this circuitry acts to limit the frequency bandwidth of the system, thereby maximizing the signal-to-noise ratio. Because of the narrow bandwidth and high signal-to-noise ratio, the system is highly sensitive, and it can be made to detect very weak signals.

In order to prevent undesirable feedback oscillation, it is desirable to frequency-shift the signal between successive blocks of amplification, so that, even if the signal couples back, it will couple back at the wrong frequency to make any difference. This is the practice used in common superheterodyne radio receivers. Another technique which can be employed to reduce such coupling is differential amplification, so that only the difference between two signals is amplified. If a stray signal is fed back almost equally to the two inputs, the *difference* signal which results across the inputs will be small and the system will have a high common mode rejection.

The Gilbert Cell mixers used in the receivers of the collar unit employ both of these techniques. Because the Gilbert Cell has a differential input, any signal that feeds back equally to both sides of an antenna will not be picked up. In addition, the Gilbert Cell mixers give a gain of 40 to the RF signal picked up by the antenna *before* translating the signal down to baseband.

Ignoring the noise present (which is valid if the signal-to-noise ratio is high), the output of each receiver is a low frequency sine wave with an amplitude proportional to the field strength sensed by that particular receiver. Through more complicated means (in-phase and quadrature demodulation, for example), it would be possible to derive DC representations of the x, y, and z field strengths, but this is unnecessary in the present design, because the RMS-to-DC converter can perform its mathematical job almost as well on chopped sine waves as on chopped DC (provided the period of the sine waves is short compared to the averaging time constant of the RMS-to-DC converter). The DC levels of $B_x$, $B_y$, and $B_z$ may be thought of as representative of the amplitudes of the actual sine waves at those points in the circuit.

The time division multiplexer samples the output signals from the three receivers at a rate which is fast compared to both the period of the sine wave signals themselves, and the averaging time constant of the RMS-to-DC converter. The sampling must be either fast or slow compared to the frequency of the sine waves, or significant aliasing can occur, which can result in significant sinusoidal variations in the derived field strength signal at the output of the RMS-to-DC converter. Since the sample time of the time division multiplexer (also referred to as the chopping period) must be short compared to the averaging time constant of the RMS-to-DC converter (in order to avoid output ripple), it is desirable to make the chopping period short compared to the period of the sinusoidal receiver output signals as well.

Two threshold detectors serve to determine which of three zones of interest the dog is in: the safe zone, the warning zone, or the zap zone. If the measured field strength is above both thresholds, the dog is said to be in the safe zone. If the signal falls below the upper ($T_1$) threshold, but is still above the lower ($T_2$) threshold, the dog is said to be in the warning zone. If the field strength signals falls below both the T1 and T2 thresholds, the dog is said to be in the zap zone. The outputs of the $T_1$ and $T_2$ threshold detectors may be considered to be digital. As previously indicated, these digital signals are fed to a microprocessor (or equivalent digital circuitry capable of implementing the warning/zap algorithm outlined in the flow chart).

As will be readily appreciated, the circuitry for the collar unit may be fabricated relatively easily from readily available components and in miniaturized form. Moreover, the components may be selected so that they require minimal power to enable relatively long-lived operation on the incorporated battery. The transmitter may be of conventional construction as may be the coaxial cable and the modified split ring antenna.

To assemble the system in any given location, it is necessary only to connect the transmitter to a suitable power source, run the cable to the center of the region in which the dog or other animal is to be restrained, and locate the antenna preferably below ground. The battery condition indicator enables the owner to determine when the battery should be replaced to ensure continued operation.

The preferred circuitry and algorithms are designed to avoid creating an impediment to the return of the dog to the safe area since no zapping or beeping will occur during such return.

Although the illustrated embodiment uses three receivers with highly directional antenna disposed orthogonally, other antenna configurations may be employed albeit with greater complexity for the mathematical derivation of the composite field strength of the field strengths of the component antennae.

The transmitting antenna will most usually and desirably be a separate element in order to achieve optimum results. However, it is also possible to make the antenna an integral part of the transmitter such as an inherent part of the transmitter oscillator. As used herein, the transmitter antenna may be separate or integrated except as otherwise described. In addition, it is understood that multiple transmitting antennae may be employed to produce safe zones with other than a circular shape.

Moreover, the transmitter may be located within the confines of the protected zone as well as outwardly thereof as shown in the illustrated embodiments. If located within the area, it should be protected from the environment as well as the restricted animal.

Although the receiver assembly has been illustrated as mounted on a collar, it will be appreciated that the unit could be worn by the animal in other forms such as a belt, helmet or cap, bracelet, or other article which may be placed in a secure fashion on the animal.

Although the restraining system of the present invention has been described in detail with respect to a dog, it will be appreciated that it may also be employed with other animals such as horses and cats. Moreover, it may also be employed to restrict movement of children and mentally ill persons, or to assist in confining persons in home confinement programs. For applications to humans, the types of warning signals generated by the receiver would be modified appropriately. The term "animal" as used herein is intended to encompass humans as well as domesticated and other animals.

Thus, it can be seen from the foregoing detailed specification and attached drawings, that the animal retraining system of the present invention is simple in construction and reliable in operation. The microprocessor contained within the collar unit is adapted to process rapidly the information from the receivers to determine what signals, if any, are required to be generated, and to avoid the undesirable aspects of unlimited warning signals.

Having thus described the invention, what is claimed is:

1. An animal restraining system comprising:
   (a) a radio frequency transmitter for generating radio signals and adapted to be located in or adjacent an area in which an animal is to be restrained;
   (b) a transmitting antenna operatively connected to said transmitter for radiating radio frequency signals generated by said transmitter; and
   (c) a unit adapted to be worn by the animal, said unit comprising:
      (i) a multiplicity of radio signal receivers each having a receiving antenna with said receiving antennae of said multiplicity of receivers having their axes of maximum sensitivity oriented in different directions;
      (ii) means for deriving a composite field strength based upon the field strengths of the radio signals received by said receiving antennae;
      (iii) means for detecting when the composite field strength detected by said receiving antennae falls below a predetermined value; and
      (iv) means in said unit responsive when the composite field strength falls below said predetermined value for generating warning signals to the animal.

2. An animal restraining system in accordance with claim 1 wherein there are at least three receivers in said unit.

3. An animal restraining system in accordance with claim 1 wherein there are three receivers in said unit and said composite field strength is the vector sum of the detected field strengths as would be derived by taking the square root of the sum of the squares of the field strengths of the signals received by three highly directional equally sensitive antennae oriented with mutually perpendicular axes of maximum sensitivity.

4. An animal restraining system in accordance with claim 3 wherein said three antennae are oriented orthogonally.

5. An animal restraining system in accordance with claim 1 wherein the field strength vector of the signals received by said antennae are time division multiplexed and converted to a DC voltage.

6. An animal restraining system in accordance with claim 5 wherein said conversion is effected by a RMS to DC converter.

7. An animal restraining system in accordance with claim 1 wherein said receiving antennae are of the magnetic loop type.

8. An animal restraining system in accordance with claim 7 wherein said transmitting antenna is of magnetic loop type with a split shield.

9. An animal restraining system in accordance with claim 7 wherein said transmitting antenna is of magnetic loop type and said receiving antennae have ferrite cores.

10. An animal restraining system in accordance with claim 1 wherein said detecting means detects when the composite field strength falls below first and second predetermined values.

11. An animal restraining system in accordance with claim 10 wherein said unit includes
    (a) means in said unit responsive when the composite field strength falls below said predetermined value for generating warning signals to the animal; and
    (b) second means in said unit responsive when the detected composite field strength falls below said second predetermined value for generating a second and different warning signal to the animal.

12. An animal restraining system in accordance with claim 11 wherein said unit includes means for initiating said second warning signal means if the animal remains in an area within the range bracketed by said first and second predetermined values for a period in excess of a predetermined time.

13. An animal restraining system in accordance with claim 12 wherein there is included means for disabling said second warning signal means if the animal does not leave said area bracketed within said range and return to an area with a field strength greater than said first predetermined value.

14. An animal restraining system in accordance with claim 1 wherein there is included means for disabling said warning signal means if the animal remains in an area where the field strength is below said predetermined value for a period in excess of a predetermined time.

15. An animal restraining system in accordance with claim 14 wherein said disabling means for said warning signal means is reset and the system reactivated upon return of the animal to an area wherein the said composite field strength is above said predetermined value for a predetermined time interval.

16. An animal restraining system in accordance with claim 1 wherein there is included means for analyzing the composite field strength for a period before said warning signal generating means is activated.

17. An animal restraining system in accordance with claim 1 wherein the transmitter operating frequency is 80 KHz to 20 MHz.

18. An animal restraining system in accordance with claim 1 wherein there is included a microprocessor to receive the output of said detecting means and provide said responsive means.

19. An animal restraining system in accordance with claim 1 wherein said receiving antennae are highly directional.

20. An animal restraining system comprising:
 (a) a radio frequency transmitter for generating radio signals and adapted to be located in or adjacent an area in which an animal is to be restrained;
 (b) a transmitting antenna operatively connected to said transmitter for radiating radio frequency signals generated by said transmitter;
 (c) a unit adapted to be worn by the animal, said unit comprising:
  (i) three radio signal receivers each having a highly directional receiving antenna with said receiving antennae of said multiplicity of receivers having their axes of maximum sensitivity orthogonally oriented;
  (ii) digital processing circuitry;
  (iii) means for determining a vector sum of the field strengths of the radio signals received by said receiving antennae, said vector sum of the detected field strength of the signals received by said antennae being derived from the square root of the sum of the squares of the field strengths of the signals received by the three receivers;
  (iv) means for detecting when the vector sum of field strengths detected by said receivers falls below first and second predetermined values;
  (v) first means in said unit responsive when the detected vector sum of said field strengths falls below said first predetermined value for generating a first warning signal to the animal;
  (vi) second means in said unit responsive when the detected vector field strength falls below said second predetermined value for generating a second and different warning signal to the animal; and
  (vii) means for analyzing the vector sum for a period of time before said warning signal generating means are activated.

21. The animal restraining system in accordance with claim 20 wherein the field strength signals from said receivers are time division multiplexed and converted to a DC voltage.

22. The animal restraining system in accordance with claim 21 wherein said multiplexing and conversion is effected by a RMS to DC converter.

23. The animal restraining system in accordance with claim 20 wherein said transmitting and receiving antennae are of the magnetic loop type, wherein said receiving antennae have ferrite cores, and wherein said magnetic loop transmitting antenna has a split shield.

24. The animal restraining system in accordance with claim 20 wherein said unit includes means for initiating said second warning signal means if the animal remains in an area within the range bracketed by said first and second predetermined values for a period in excess of a predetermined time, and there is included means for disabling said second warning signal means if the animal does not leave said area bracketed within said range and return to an area with a field strength greater than said first predetermined value within a predetermined period of time.

25. The animal restraining system in accordance with claim 20 wherein there is included means for disabling both of said warning signal means if the animal remains in an area where the field strength is below said second predetermined value for a period in excess of a predetermined time.

26. The animal restraining system in accordance with claim 25 wherein said disabling means for said warning signal means is reset and the system reactivated upon return of the animal to an area wherein the said vector sum of said signal field strengths is above said first predetermined value for a predetermined time interval.

27. The animal restraining system in accordance with claim 20 wherein the operating frequency is 80 KHz to 20 MHz.

* * * * *